3,350,303
PROCESS FOR PREPARING A COAGULANT FROM PYROPHYLLITE AND CLARIFYING WATER WITH IT
Oliver M. Bacon, Arvada, Colo., assignor to The Hunnewell Soap Company, Cincinnati, Ohio, a corporation of Ohio
No Drawing. Filed Dec. 21, 1964, Ser. No. 420,113
5 Claims. (Cl. 210—47)

This invention relates to a new and useful engine coagulant for flocculating solids suspended in aqueous solutions; and more particularly relates to a coagulant and method of preparing same for use in the treatment and clarification of raw or natural waters.

Generally stated, chemical precipitation consists in adding to water such chemicals as will by reaction with one another and with the solid constituents in the water produce flocculant precipitation and thus hasten sedimentation. In treating raw or natural waters, for instance, to remove colloidal and suspended particles together with bacteria and other objectional substances, the effectiveness of the coagulant is measured largely by the speed of floc formation, rapidity of settling and clarity of the water upon settling in relation to the quantity and cost of ingredients comprising the coagulant. Related considerations are the number of operations required in treatment and the closeness of control over the coagulant irrespective of variations in the turbidity of the water. Conventionally, the coagulant is introduced to the water in a mixing basin and upon stirring or agitation will produce a flocculant precipitate which will entrap the particles in suspension and bring about rapid sedimentation. For example, silica sols prepared by the partial neutralization of sodium silicate solutions are employed in combination with iron or aluminum salts to aid in the flocculation of impurities, typical processes of this type being disclosed in the patents to Schworm et al. No. 2,234,285 and Baker et al. No. 2,310,009.

In accordance with the present invention, the mineral pyrophyllite has been found to contribute in an unexpected and wholly unique manner to the clarification of aqueous solutions. Chemically, pyrophyllite is a hydrous silicate of aluminum and may be expressed by the formula $H_2Al_2(SiO_3)_4$ which corresponds to 67% silica, 28% alumina and 5% water, although the silica and alumina content may vary widely depending upon the source of the material. In its natural state, pyrophyllite has a foliated or fibrous texture wherein the aluminum oxide present is encased or sandwiched between the silica layers; however, when finely comminuted and acidified, the constituent layers are broken down freeing the aluminum oxide and resulting in the formation of a silica gel in a physical form which can be easily worked and is susceptible to further treatment. Of added importance is the fact that the acidulated pyrophyllite upon reaction with an alkaline salt of aluminum in sufficient quantities will, when subsequently introduced into raw water or other aqueous solutions, rapidly form a large gelatinous floc which will hasten sedimentation and clarification to an extent well beyond that which would normally be expected for the quantity of coagulant introduced.

Accordingly, a principal and foremost object of the present invention is to provide for a new and useful coagulant involving the use of the mineral pyrophyllite for clarifying aqueous solutions.

It is another object of the present invention to selectively combine pyrophyllite and an alkaline metal salt in such a way that when introduced into raw or natural waters the constituents will combine to more rapidly form a complex gelatinous floc characterized by its ability to attract and to rapidly settle out the existing turbidity as well as to increase the settling rate of other flocs added to the water.

It is a further object to provide for an improved, more effective flocculating agent and method of preparing same for settling suspended solids; and wherein the agent is characterized by being highly economical to prepare and to use, and can also be combined with other agents to clarify and soften the water in one operation.

In practicing the present invention, the mineral pyrophyllite is acidified with a concentrated acid solution to form a silica gel in a physical form which lends itself very well for use as a flocculating agent. However, it has been found that the silica gel will act most effectively as a flocculating agent when reacted with sufficient amounts of an alkali metal aluminate selected from the known aluminate compounds, such as sodium aluminate, to raise the pH level above the acid reaction state and to form a loose suspension of the silica gel and a soluble alumina. Thereafter, when introduced into raw or natural water, the alkalinity of the coagulant is reduced whereupon the alumina will be converted to insoluble aluminum hydroxides that will coalesce very rapidly with the silica to form a gelatinous floc. Otherwise, if the pH level is not raised above the acid reaction level, the aluminate compound when reacted with the silica gel becomes highly insoluble, very likely due to the immediate conversion of the alumina to an insoluble aluminum hydroxide and possibly due also to the formation of a highly insoluble aluminum silicate on the surfaces of the silica and alumina phases which will prevent the underlying oxides from subsequently passing into the solution and coalescing with the silica.

Most desirably the coagulant should reach a pH level of in excess of 11 when suspended in the ratio of 1 grain of coagulant for 1 U.S. gallon of distilled water. Beneath that level, although not critical, the aluminate will upon reaction tend to form, at least in part, an insoluble mass which is of little effectiveness when added to the water to be treated; and the insolubility of the coagulant increases rapidly with a corresponding reduction in pH value until at values below a pH of 9 the coagulant produced is for the most part insoluble. It will be evident that the pH value can be regulated by the ratio of aluminate to the acidified pyrophyllite. Furthermore, the acidified pyrophyllite should be added to the aluminate compound, as opposed to the inverse procedure, in order to avoid an acid reaction level during the early stage of mixing. Necessarily, the amount of alkali metal aluminate will vary according to the relative percentage of silica and alumina in the pyrophyllite, and for example the silica content may vary anywhere from 50% to 80% by weight of the pyrophyllite in its natural state. By way of illustration, for a pyrophyllite having a silica content on the order of 60 to 70%, sodium aluminate may be reacted in the ratio of 2 to 3 parts by weight sodium aluminate to 3 parts by weight pyrophyllite. In applying this general ratio, however, the acidified pyrophyllite is first treated with an alkali metal carbonate to gradually increase the pH level of the pyrophyllite in order to avoid a violent reaction with the aluminate compound.

In the following, specific examples and tests are presented to illustrate the use of the present invention for clarification of raw or natural waters in municipal filter plants. To this end, jar tests are referred to in order to demonstrate effective use of the coagulant in water works practice, although its adaptation to other uses on a larger scale will be readily seen and appreciated by those skilled in the art.

*Example 1*

In the practice of my invention 150 grams of pyrophyllite in finely divided form was placed in a container and treated with 75 grams of water and 100 grams concentrated sulfuric acid to form a silica gel. Upon cooling, and for the purpose of gradually increasing the pH level of the silica gel without severe reaction, the solution was slowly introduced, with mixing, into 50 grams of sodium carbonate. Thereafter, the resultant solution was slowly added to 100 grams of sodium aluminate and rapidly stirred and intermixed with the aluminate until the slurry became highly viscous, then with further stirring began to crumble and become granular; the final pH level was 11.8. By addition of the silica gel to the sodium aluminate, as opposed to addition of the aluminate into the silica solution, the early formation of insoluble aluminum hydroxide and aluminum silicate was avoided due to the initially low pH level of the solution, as illustrated by the the results obtained in Example 2.

*Example 2*

In another procedure 150 grams pyrophyllite were added to 50 grams water, mixed, then further mixed with 100 grams of concentrated sulfuric acid. To this solution 100 grams sodium aluminate were added slowly with constant stirring. The reaction was accompanied with much heat and release of moisture and the materials soon became quite stiff, unworkable and hard necessitating crushing and pulverizing. The final material was quite different in properties and characteristics from that derived from Example 1 indicating the formation of an insoluble mass.

*Example 3*

One hundred fifty grams pyrophyllite were treated with 75 grams water and 100 grams concentrated sulfuric acid, then cooled to room temperature. Forty grams sodium carbonate were added with mixing and the resultant solution was slowly mixed into 100 grams sodium aluminate until dry. The material was crushed and pulverized and had a final pH level of 11.3.

*Example 4*

One hundred fifty grams pyrophyllite were treated with 50 grams water and 100 grams sulfuric acid. A solution consisting of 16 grams sodium hydroxide and water were slowly added and the resultant solution then added to 150 grams of aluminate. The final pH level was 9.9.

In order to evaluate the comparative effectiveness of a coagulant prepared according to the present invention and a conventional treatment employing Water Works Alum alone, tests were performed on raw water having an approximate turbidity of 350 p.p.m., a total hardness of 164 p.p.m., and a pH of 8.0. The alum used was aluminum sulfate of a commercial grade containing 17% $Al_2O_3$. The coagulant employed was prepared in accordance with Example 1; and in the following 500 ml. samples of raw water were used in conducting each test with mechanical stirring at approximately 50 r.p.m. applied to each set of test samples simultaneously. The results were as follows:

In test No. 1, 4 g.p.g. of alum when added to a sample produced no appreciable floc in the sample in 10 minutes; whereas, 3 g.p.g. of alum and 1 g.p.g. of coagulant added to a sample formed floc in 3 minutes, although the particles precipitated were relatively small. In test No. 2, 5 g.p.g. alum added to a sample produced a light floc in 3 minutes but did not coagulate in 10 minutes. However, 4 g.p.g. of alum and 1 g.p.g. of pyrophyllite coagulant when added to a sample produced floc in 1 minute and continued to give larger particles and a clearer solution in 10 minutes. In test No. 3, 6 g.p.g. alum added to a sample produced a light floc in 2 minutes and gradually coagulated to good floc in 30 minutes leaving a smokey cast in the solution. In comparison, 5 g.p.g. alum with 1 g.p.g. pyrophyllite coagulant when added to another sample produced floc at 1 minute steadily increasing in particle size and leaving a good clear solution in 30 minutes. In test No. 4, 7 g.p.g. alum added to a sample produced some floc in 2 minutes with the floc steadily coagulating and the solution clearing by the end of 30 minutes. Of particular note, 4 g.p.g. of alum and ¼ g.p.g. pyrophyllite coagulant produced some floc in 1 minute which increased with steady coagulation and clearing solution within 30 minutes. The floc particles were larger and more rapidly formed. At the end of test No. 4, the two solutions were allowed to settle for 30 minutes after stirring was stopped; the settling rate of the sample containing the pyrophyllite coagulant was observed to be much more rapid than the alum sample. In general, from all the tests conducted, the combined use of pyrophyllite coagulant and alum produced a larger and faster settling floc, and substantially reduced amounts of alum were required when the pyrophyllite coagulant was used.

In another series of tests, the pyrophyllite coagulant combined with alum and lime was compared with the use of alum, lime and minor amounts of activated silica. The increased effectiveness of the pyrophyllite coagulant will be noted from the following jar tests on water samples taken from a municipal water plant having a hardness of 252 p.p.m., a turbidity of 110 and pH of 8.35:

| Jar No. | Alum (p.p.m.) | Lime (p.p.m.) | Pyrophyllite Coagulant (p.p.m.) | Floc Index [1] | Hardness (p.p.m.) | Duration Stir | Duration Settle |
|---|---|---|---|---|---|---|---|
| 1 | | 200 | 5 | 6 | 136 | 15 | 15 |
| 2 | 5 | 200 | | | 143 | 15 | |
| 3 | | 100 | 5 | 6 | 146 | Floc in 8 min. | |
| 4 | | 100 | 5 | 10 | 137 | Floc in 1 min. | |
| 5 | 20 | 100 | | 5 | 157 | Floc in 15 min. | |
| 6 | 10 | 100 | | 5 | 172 | Floc in 15 min. | |

[1] Floc Index: 12-heavy, 10-excellent, 8-good, 6-fair, 4-pinpoint, 2-smokey, 0-no floc.

From the foregoing tests it will be noted in jar tests 1 and 2 that the use of my coagulant with lime had a better floc index and resulted in a lower hardness than the combined use of alum and lime in test No. 2. In addition, comparing tests 3 and 4, again the combined use of my coagulant and lime had a much higher floc index and lower hardness when compared with the use of appreciably greater amounts of alum and lime. It was further noted that my coagulant resulted in a faster forming floc, clearer and softer water, while affording a much more economical operation.

As an alternate procedure for preparing the coagulant, it has been found that the properties of the pyrophyllite as a flocculating agent are further enhanced by the use of calcined or uncalcined phosphate rock. Preferably the phosphate is mixed with the pyrophyllite prior to treatment with an acid solution to form the gel. For example, 75 grams of calcined phosphate rock were intermixed with an equal amount of pyrophyllite at a 200 mesh size with the addition of a minor amount of water on the order of 50 to 80 milliliters. 75 grams of sulphuric acid were added to the mix and permitted to stand until a thick gel was formed. 55 grams of soda ash were added, with mixing, then cooled until dry; and thereafter a sufficient amount of sodium aluminate on the order of 180 grams was added by grinding to raise the pH level above 11.

As another example using uncalcined phosphate rock, 75 grams of uncalcined phosphate rock and pyrophyllite were intermixed with a minor proportion of water as in the previous example, 100 grams of sulphuric acid were added to form a thick gel. The resultant gel was then treated by mixing in 82 grams of soda ash and cooled, after which 180 grams of sodium aluminate were added to raise the pH level to above 11.

Apart from the examples set forth, it is emphasized that under suitable conditions the pyrophyllite coagulant may be used alone, or can be effectively used in combination with other flocculating agents such as alum or lime, the lime being added in accordance with conventional practice to reduce the hardness of the water. Moreover, my coagulant can be introduced either simultaneously with the alum or lime, or added separately thereby reducing the number of operations required and closeness of control over introduction of the different ingredients.

There was in practice no critical limit discernable for the pH level necessary to prevent formation of aluminum hydroxide or aluminum silicate, although best results have been obtained when the pH value was above 11. Below that level, some insolubility was noted in the coagulant produced and was observed not to be as effective for a given quantity introduced. In commercial practice, the coagulant may be fed into a mixing device in which it goes into solution or colloidal suspension, then is delivered into the water to be treated, and which normally has been subjected to preliminary sedimentation before introducing the coagulant. This mixture, with the addition of alum and lime may then be passed into the flocculator and stirred gently to induce good flocculation and settling, after which it flows into sedimentation tank or clarifier for final separation.

It will be seen from the foregoing that the coagulant of the present invention when used in combination with other ingredients, such as, alum or lime, results in more rapid floc formation and settling while reducing the quantity, and consequently the cost, of other ingredients needed both in clarifying and softening the water. Moreover, it is possible to reduce the number of operations required in that the various ingredients may be introduced simultaneously and do not necessitate close, exact control, notwithstanding variations in turbidity of the water. Thus, the reduced quantity and cost of the ingredients required together with the reduced number of operations while effecting notable improvements in the settling process clearly demonstrate the utility and effectiveness of the coagulant produced in accordance with the present invention.

It is to be understood that while the present invention has been described in its preferred and modified forms by reference to the use of certain specific ingredients, other equivalent substances may be utilized for example in preparing the acidified pyrophyllite for use as a coagulant. Thus, in the foregoing example, the sodium aluminate compounds used were those sold commercially by Nalco Chemical Company under the trade names Nalco 680 and Nalco 614 and having compositions and properties as set forth and disclosed in Patent No. 3,101,317 to James E. Starry. However, other commercially available alkali metal aluminates, such as potassium and cesium may be substituted for the sodium aluminates; and other alkaline salts of aluminum may be employed but not with the same effectiveness demonstrated by the aluminate compounds when combined with the pyrophyllite. Furthermore, the exact sequence of steps followed in carrying out preparation of the coagulant and treatment of the water may be varied without departing from the spirit and scope of the present invention as defined by the appended claims and reasonable equivalents thereof.

What is claimed is:

1. A process for preparing a coagulant comprising the steps of first acidifying pyrophyllite with a concentrated acid solution, reacting the acidified pyrophyllite with a minor proportion of an alkaline metal carbonate to gradually increase the pH level of the acidified pyrophyllite, followed by adding the resultant mixture to sodium aluminate and stirring the mix to form a dry powdery mass, the sodium aluminate being present in an amount sufficient to maintain the pH level of the coagulant above 11 when one grain of the coagulant is suspended in one U.S. gallon of distilled water.

2. A process for preparing a coagulant comprising the steps of first acidifying a pyrophyllite with a concentrated solution of sulfuric acid, combining the acidified pyrophyllite with a minor proportion of soda ash to gradually increase the pH level thereof, followed by slowly adding the resultant mixture to sodium aluminate, and stirring the mixture to form a dry powdery mass, the sodium aluminate being present in an amount sufficient to form a loose suspension of silica and alumina without the substantial formation of aluminum hydroxide when one grain of the mass is suspended in one U.S. gallon of distilled water.

3. A process of clarifying water comprising the steps of first acidifying pyrophyllite to form a silica gel, reacting the acidified pyrophyllite with a minor proportion of a soda ash to gradually increase the pH level of the solution, adding the solution to sodium aluminate and stirring until a dry powdery material is formed, and thereafter adding small amounts of the material to the water to be treated as a coagulant aid.

4. A process according to claim 3 being further characterized by introducing the material as a coagulant in the ratio of 1 part by weight of the material to from 3 to 8 parts by weight of aluminum sulphate.

5. A process for preparing a coagulant comprising the steps of first acidifying a mixture of equal amounts of pyrophyllite and phosphate with a concentrated sulfuric acid solution to form a gel, reacting the gel with a minor proportion of soda ash to gradually increase the pH level of the gel, followed by adding the resultant mixture to sodium aluminate, the sodium aluminate being present in an amount sufficient to maintain the pH level of the coagulant above 11 when 1 grain of the coagulant is suspended in 1 U.S. gallon of distilled water.

References Cited

UNITED STATES PATENTS

| 2,220,667 | 11/1940 | Travis | 252—317 X |
| 2,841,471 | 7/1958 | Sensel | 23—112 |

FOREIGN PATENTS

| 434,663 | 9/1935 | Great Britain. |

MORRIS O. WOLK, *Primary Examiner.*

MICHAEL E. ROGERS, *Examiner.*